United States Patent
Pydin

(10) Patent No.: US 10,480,639 B2
(45) Date of Patent: Nov. 19, 2019

(54) VEHICLE DRIVE APPARATUS

(71) Applicant: Honda Motor Co., Ltd., Tokyo (JP)

(72) Inventor: Andrii Pydin, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/101,190

(22) Filed: Aug. 10, 2018

(65) Prior Publication Data

US 2019/0063589 A1 Feb. 28, 2019

(30) Foreign Application Priority Data

Aug. 29, 2017 (JP) ................... 2017-164383

(51) Int. Cl.
| | |
|---|---|
| *F16H 57/04* | (2010.01) |
| *F16H 37/08* | (2006.01) |
| *B60K 1/00* | (2006.01) |
| *B60K 17/16* | (2006.01) |

(52) U.S. Cl.
CPC ....... *F16H 57/0479* (2013.01); *F16H 37/082* (2013.01); *F16H 57/043* (2013.01); *F16H 57/0486* (2013.01); *B60K 1/00* (2013.01); *B60K 17/165* (2013.01); *B60K 2001/001* (2013.01); *B60K 2001/006* (2013.01)

(58) Field of Classification Search
CPC . F16H 57/0479; F16H 57/043; F16H 57/0426
See application file for complete search history.

(56) References Cited

U.S. PATENT DOCUMENTS

| | | | | |
|---|---|---|---|---|
| 9,194,483 | B2 * | 11/2015 | Igarashi | F16H 57/0427 |
| 9,541,457 | B2 * | 1/2017 | Oya | G01K 7/427 |
| 9,593,986 | B2 * | 3/2017 | Ito | G01K 7/427 |
| 9,726,057 | B2 * | 8/2017 | Yamauchi | F01M 1/02 |

FOREIGN PATENT DOCUMENTS

JP      2013137073 A     7/2013

* cited by examiner

*Primary Examiner* — Erin D Bishop
(74) *Attorney, Agent, or Firm* — Duft & Bornsen, PC

(57) ABSTRACT

A vehicle drive apparatus including a rotor having a plate portion formed in a substantial ring shape to cover a planetary gear from above and a cylindrical portion erected from an outer periphery of the plate portion to transmit a torque through a planetary gear mechanism to a rotating shaft, and an oil passage forming part forming an oil passage so as to lead a lubricating oil supplied from a hydraulic power source from above the rotor through an upper surface of the plate portion to the planetary gear. The oil passage forming part includes plate through-holes formed vertically in the plate portion and a shaft through-hole formed inside the planetary shaft from an upper surface to an outer peripheral surface thereof. The plate through-holes are arranged along a circle defined a distance from the axial line to the planetary shaft as a radius.

8 Claims, 9 Drawing Sheets

US 10,480,639 B2

VEHICLE DRIVE APPARATUS

CROSS-REFERENCE TO RELATED APPLICATION

This application is based upon and claims the benefit of priority from Japanese Patent Application No. 2017-164383 filed on Aug. 29, 2017, the content of which is incorporated herein by reference.

BACKGROUND OF THE INVENTION

Field of the Invention

This invention relates to a vehicle drive apparatus.

Description of the Related Art

Conventionally, there is a known apparatus in which a support shaft internal lubricating oil passage is formed inside a support shaft for rotatably supporting a planetary gear by means of an arm linkage extending radially outward from an axle, and lubricating oil is supplied to the planetary gear through this support shaft internal lubricating oil passage. An apparatus of this type is described in Japanese Unexamined Patent Publication No. 2013-137073 (JP2013-137073A), for example. In the apparatus taught by JP2013-137073A, an axle interior lubricating oil passage is formed inside the axle, an arm linkage interior lubricating oil passage is formed inside the arm linkage, and lubricating oil is supplied to the support shaft internal lubricating oil passage via the axle interior lubricating oil passage and the arm linkage interior lubricating oil passage.

However, the apparatus described in JP2013-137073A complicates a configuration of the planetary gear mechanism because it requires provision of the arm linkage interior lubricating oil passage inside the arm linkage so as to communicate with the support shaft internal lubricating oil passage.

SUMMARY OF THE INVENTION

An aspect of the present invention is a vehicle drive apparatus including: a rotating shaft extending along an axial line in a vertical direction; a planetary gear mechanism including a sun gear provided around the rotating shaft, a ring gear provided around the sun gear, a planetary gear between the sun gear and the ring gear to engage with the sun gear and the ring gear, a planetary shaft extending parallel to the axial line to rotatably support the planetary gear, and a carrier configured to support the planetary shaft; a rotor including a plate portion formed in a substantially ring shape to cover the planetary gear from above and a cylindrical portion erected from an outer periphery of the plate portion to transmit a torque through the planetary gear mechanism from the rotor to the rotating shaft or from the rotating shaft to the rotor; and an oil passage forming part configured to form an oil passage so as to lead a lubricating oil supplied from a hydraulic power source from above the rotor through an upper surface of the plate portion to the planetary gear. The oil passage forming part includes plate through holes and a shaft through hole. The plate through holes are formed vertically in the plate portion so as to penetrate the plate portion and arranged in a circumferential direction along a circle defined a distance from the axial line to the planetary shaft as a radius. The shaft through hole is formed inside the planetary shaft so as to penetrate the planetary shaft from an upper surface to an outer peripheral surface of the planetary shaft.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
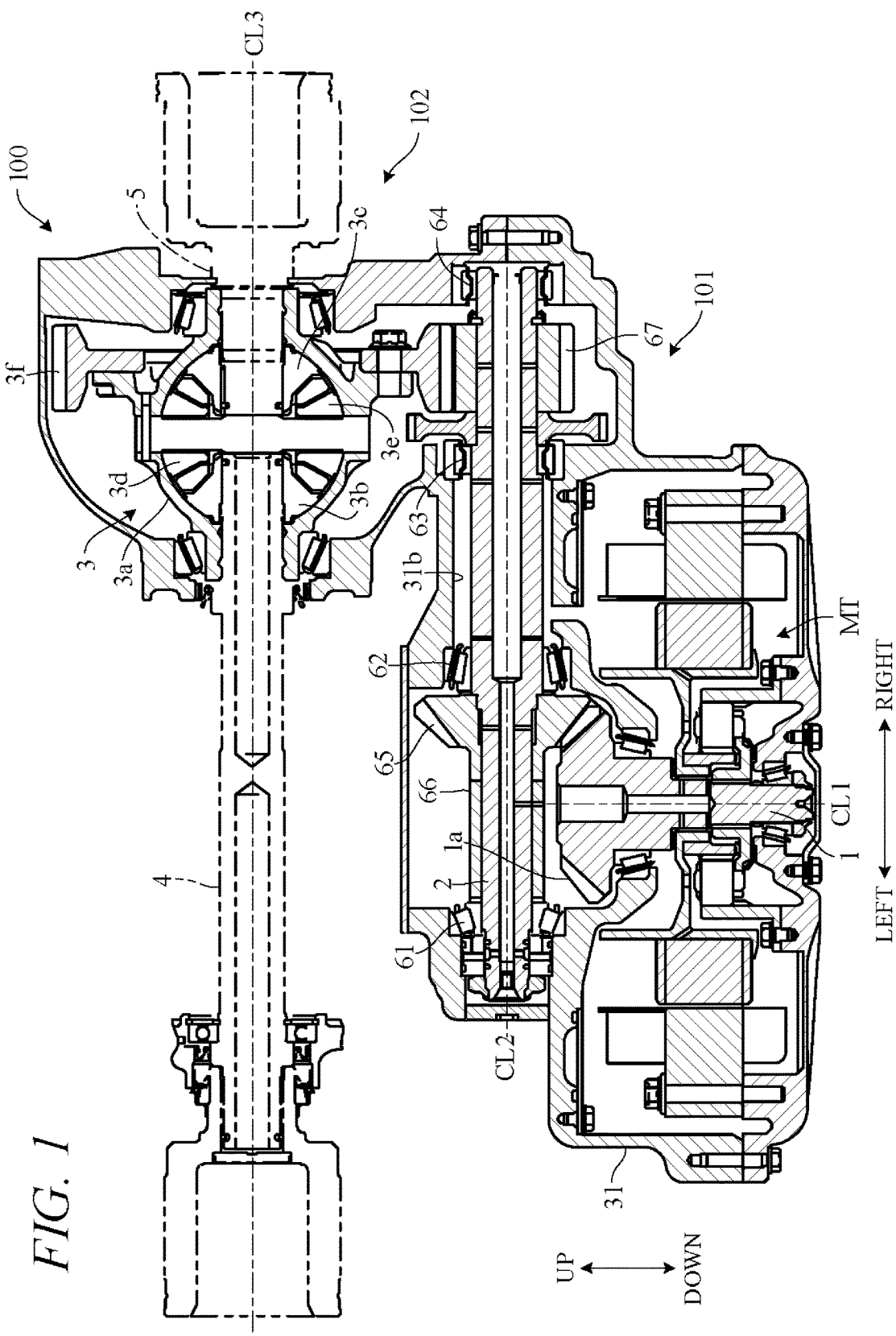
FIG. 1 is a cross-sectional diagram showing a developed view of main components of a vehicle drive apparatus according to an embodiment of the present invention.

Hereinafter, an embodiment of the present invention is explained with reference to FIGS. 1 to 7. FIG. 1 is a cross-sectional diagram showing a developed view of main components of a vehicle drive apparatus 100 according to the embodiment of the present invention. The vehicle drive apparatus 100 includes an electric motor MT as an example of a dynamoelectric machine and is configured to output torque from the electric motor MT to driving wheels of a vehicle. Therefore, the vehicle drive apparatus 100 is mounted on an electric vehicle, hybrid vehicle or other vehicle having the electric motor MT as a drive (propulsion) power source. The electric motor MT is also used as a generator. In FIG. 1, under a condition that the vehicle drive apparatus 100 is mounted on the vehicle, vehicle vertical (height) direction, i.e., up-down direction and lateral (width) direction, i.e., left-right direction are indicated by arrows.

As shown in FIG. 1, the vehicle drive apparatus (vehicle drive unit) 100 includes a first drive unit 101 for converting and outputting torque of the motor MT as torque centered on a lateral axis CL2 and a second drive unit 102 for converting and outputting torque output from the first drive unit 101 as torque centered on a lateral axis CL3. Although the second drive unit 102 appears above the first drive unit 101 in the developed view of FIG. 1, the second drive unit 102 is actually situated forward or rearward of the first drive unit 101, and axis CL3 is located below axis CL2 (see FIGS. 4A and 4B).

As shown in FIG. 1, the vehicle drive apparatus includes the motor MT, a first shaft 1 rotatably supported centered on a vertical axis CL1 extending in up-down direction inside the motor MT, a second shaft 2 rotatably supported centered on the axis CL2 orthogonal to the axis CL1, and a differential 3 rotatably supported centered on the axis CL3 parallel to the axis CL2. Torque from the motor MT is transmitted through the first shaft 1, second shaft 2 and differential 3 to left and right drive shafts 4 and 5, whereby left and right drive wheels are driven.

Figure 2:
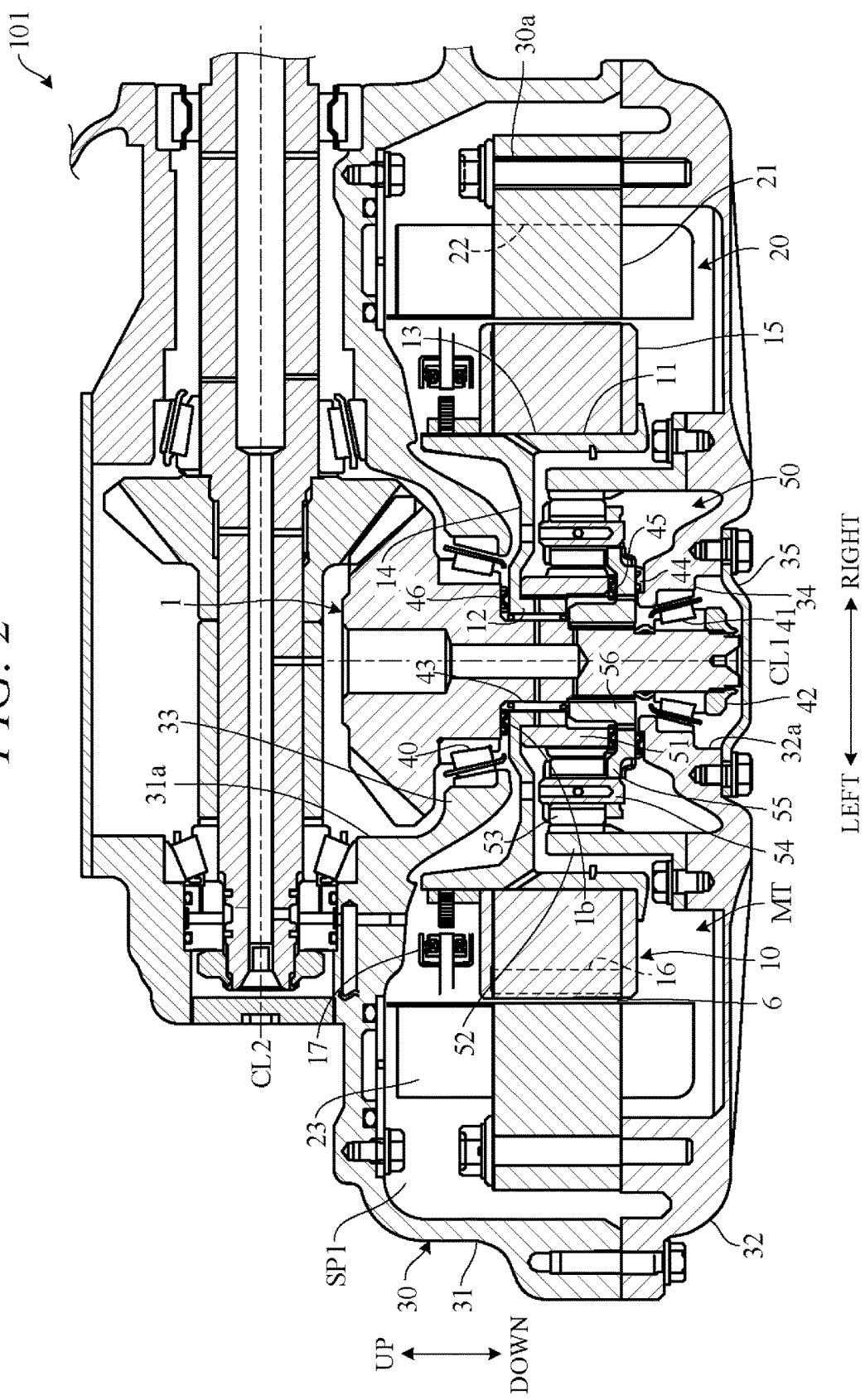
FIG. 2 is an enlarged view of main parts of the vehicle drive apparatus of FIG. 1.

FIG. 2 is an enlarged view of main parts of the first drive unit 101 of FIG. 1. As shown in FIG. 2, the motor MT includes a rotor 10 which rotates centered on the axis CL1 and a stator 20 arranged around the rotor 10. The rotor 10 and stator 20 are accommodated in a housing space SP1 inside a case 30.

The rotor 10 includes a rotor hub 11 and a rotor core 15. The rotor hub 11 includes a substantially cylinder-shaped shaft portion 12 centered on the axis CL1, a cylindrical portion 13 of larger diameter than and coaxial with the shaft portion 12, and a substantially disk-shaped plate portion 14 which extends radially to connect the shaft portion 12 and cylindrical portion 13. The rotor core 15 is a substantially cylinder-shaped rotor iron core centered on the axis CL1. The rotor core 15 is fitted on and fastened to an outer peripheral surface of the cylindrical portion 13 of the rotor hub 11 so as to rotate integrally with the rotor hub 11. More specifically, a serration is formed on an outer peripheral surface of the cylindrical portion 13. The rotor hub 11 and the rotor core 15 is connected through the serration.

The motor MT is an interior permanent magnet synchronous motor, and multiple circumferentially spaced permanent magnets 16 are embedded in the rotor core 15. A sensor 17 for detecting a rotational position (rotational angle) of the rotor 10 is provided above the rotor core 15. Alternatively, it is possible instead to use as the motor MT one having no magnets 16, such as a synchronous reluctance motor or switched reluctance motor.

The stator 20 has a substantially cylinder-shaped stator core 21 which is centered on the axis CL1 and disposed across a gap 6 of predetermined radial length from an outer peripheral surface of the rotor core 15. The stator core 21 is a fixed iron core whose inner peripheral surface is formed with multiple circumferentially spaced radially outward directed slots 22. A winding 23 (coil) is formed in the slots 22 as a concentrated winding or distributed winding. Upper and lower ends of the winding 23 protrude upward and downward of upper and lower ends of the stator core 21. The rotor 10 rotates when a revolving magnetic field is generated by passing three-phase alternating current through the winding 23.

The case 30 includes an upper case 31 and a lower case 32 which are vertically separable. The stator core 21 is fastened to the flanges 321a by through-bolts 30a. Substantially circular openings 31a and 32a centered on the axis CL1 are formed at a middle region of the upper case 31 and a middle region of the lower case 32, respectively. A shaft support 33 formed in a substantially truncated cone shape is provided in the opening 31a of the upper case 31 to extend downward and radially inward. A shaft support 34 formed in a substantially truncated cone shape is provided in the opening 32a of the lower case 32 to extend upward and radially inward.

Outer peripheral surfaces of the first shaft 1 are respectively rotatably supported by the shaft supports 33 and 34 via taper roller bearings 40 and 41. The first shaft 1 is restrained in axial direction by a nut 42 fastened to its lower end portion. A cover 35 is attached to a bottom surface of the lower case 32 from outside so as to close the opening 32a. An inner peripheral surface of the shaft portion 12 of the rotor hub 11 is supported on the outer peripheral surface of the first shaft 1 via a needle bearing 43 in a manner rotatable relative to the first shaft 1.

A planetary gear mechanism 50 is interposed in a torque transmission path between the rotor 10 and the first shaft 1. The planetary gear mechanism 50 includes a sun gear 51 and a ring gear 52, both of substantially cylinder shape centered on the axis CL1, multiple circumferentially spaced planetary gears 53 disposed between the sun gear 51 and the ring gear 52, multiple circumferentially spaced planetary shafts 54 disposed inside the planetary gears 53 and extending parallel to the axis CL1 and supporting rotatably the planetary gears 53, and a substantially cylinder shaped carrier 55 placed below the planetary gears 53 ratatably centered on the axis CL1 to support bottom portions of the planetary shafts 54. A needle bearing 44 is interposed between a top surface of the shaft support 34 and a bottom surface of the carrier 55, whereby the carrier 55 is relatively rotatably supported with respect to the shaft support 34. A needle bearing 45 is interposed between a top surface of the carrier 55 and a bottom surface of the sun gear 51, whereby the sun gear 51 is relatively rotatably supported with respect to the carrier 55.

An inner peripheral surface of the sun gear 51 is spline-fitted on an outer peripheral surface of the shaft portion 12 of the rotor hub 11, whereby rotation of the rotor 10 is transmitted to the sun gear 51. The ring gear 52 is fixed to the upper surface of the lower case 32. The planetary gears 53 are engaged with the sun gear 51 and the ring gear 52, whereby rotation of the sun gear 51 is transmitted through the planetary gears 53 to the carrier 55. The carrier 55 has a substantially cylinder-shaped shaft portion 56 centered on the axis CL1 radially inward of the sun gear 51. An inner peripheral surface of the shaft portion 56 is spline-fitted on the outer peripheral surface of the first shaft 1 below the needle bearing 43 and above the tapered roller bearing 41, whereby rotation of the carrier 55 is transmitted to the first shaft 1.

A bevel gear 1a of larger diameter than the tapered roller bearing 40 is formed on an upper end portion of the first shaft 1 above the tapered roller bearing 40. Alternatively, the bevel gear 1a can be provided as a separate body from the first shaft 1 and integrally joined to the outer peripheral surface of the first shaft 1 by spline-fitting or the like. A step 1b is provided on the outer peripheral surface of the first shaft 1, whereby diameter of the outer peripheral surface is reduced below the step 1b. A needle bearing 46 is interposed between a top surface of the plate portion 14 of the rotor hub 11 and a bottom surface of the step 1b, whereby the first shaft 1 is relatively rotatably supported with respect to the rotor hub 11.

As shown in FIG. 1, a through-hole 31b is formed at an upper end portion of the upper case 31 along the axis CL2 in the lateral direction. The second shaft 2 is rotatably supported on the upper case 31 (a peripheral surface of the through-hole 31b) by a pair of left and right tapered roller bearings 61 and 62 installed diagonally left-upward and diagonally right-upward of the bevel gear 1a of the first shaft 1 and by a pair of left and right roller bearings 63 and 64 installed rightward of the right side tapered roller bearing 62.

The second shaft 2 is inserted along inner peripheral surfaces of a bevel gear 65 and a spacer 66, both of substantially cylinder-shape centered on the axis CL2, which are installed between the left and right tapered roller bearings 61 and 62. At the time of the insertion, the inner peripheral surface of the bevel gear 65 is spline-fitted on an outer peripheral surface of the second shaft 2, whereby the second shaft 2 rotates integrally with the bevel gear 65. Rotation of the first shaft 1 is therefore transmitted through the bevel gears 1a and 65 to the second shaft 2. A spur gear 67 is spline-fitted on the outer peripheral surface of the second shaft 2 between the roller bearings 63 and 64, whereby the spur gear 67 rotates integrally with the second shaft 2.

The differential 3 includes a differential case 3a and multiple gears housed in the differential case 3a, i.e., a pair of left and right side gears 3b and 3c respectively attached to the pair of left and right drive shafts 4 and 5, and a pair of pinion gears 3d and 3e which engage the side gears 3b and 3c. An input gear 3f fixed on the differential case 3a engages the spur gear 67 fixed to the second shaft 2, whereby torque of the second shaft 2 is transmitted through the spur gear 67 and input gear 3f to the differential case 3a. Therefore, the differential case 3a rotates around the axis CL3, and the drive shafts 4 and 5 are driven.

Thus in the present embodiment, the vehicle drive apparatus 100 is configured with the axis of rotation CL1 of the motor MT oriented in vehicle height direction, whereby overall height of the vehicle drive apparatus can be reduced as compared with a vehicle drive apparatus whose axis of rotation CL1 is oriented horizontally. A large diameter motor required for developing high output can therefore be easily installed in a height-restricted space of a vehicle.

Figure 3A:
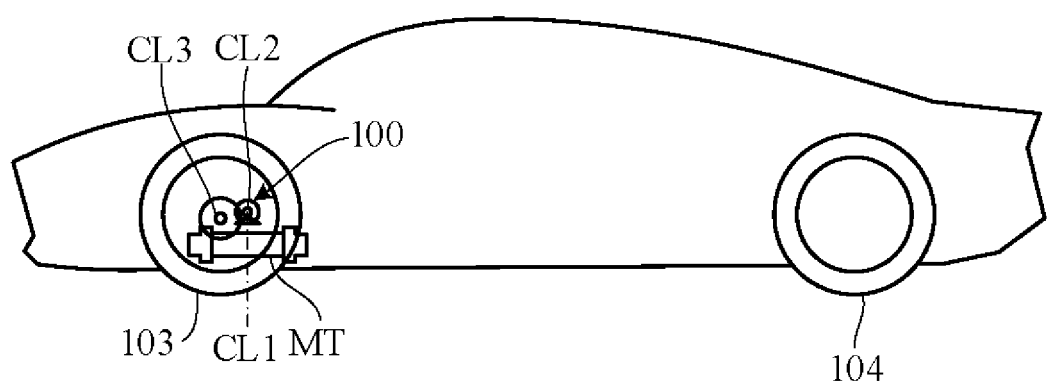
FIG. 3A is a diagram showing a first example of installing the vehicle drive apparatus of FIG. 1 in the vehicle.
Figure 3B:
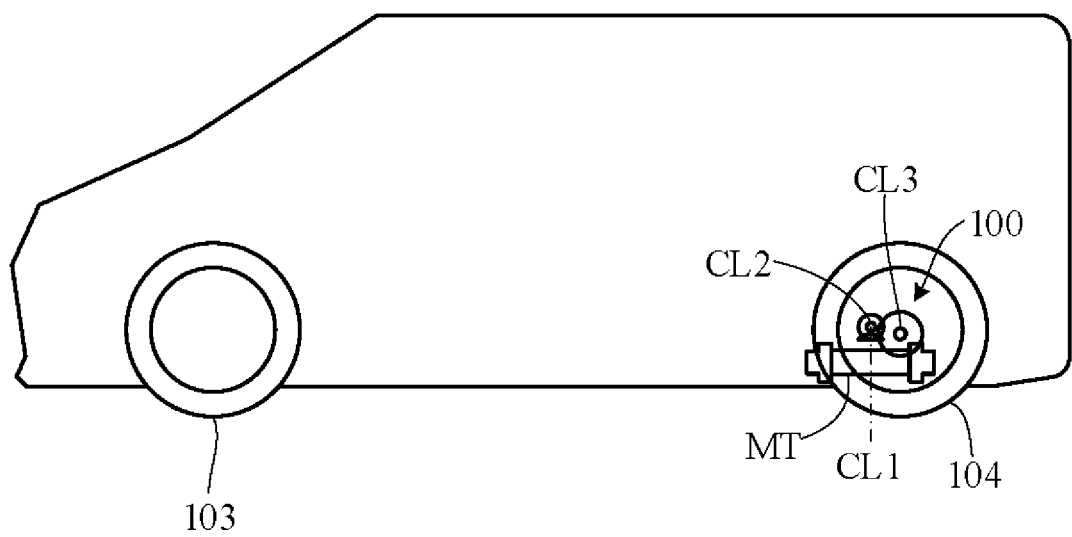
FIG. 3B is a diagram showing a second example of installing the vehicle drive apparatus of FIG. 1 in the vehicle.

FIGS. 3A and 3B are diagrams showing examples of installation of the vehicle drive apparatus 100 in vehicles. FIG. 3A shows an example of installing the vehicle drive apparatus 100 between left and right front wheels 103 for use as a front wheel drive unit. FIG. 3B shows an example of installing the vehicle drive apparatus 100 between left and right rear wheels 104 for use as a rear wheel drive unit. In either example, a top surface of the motor MT is located below the axis of rotation CL3 of the drive wheels 103 or 104. Therefore, when the vehicle drive apparatus 100 is installed in the forward part of the vehicle as shown in FIG. 3A, height of the vehicle hood can be lowered to realize enhanced superiority of design and the like. Further, when the vehicle drive apparatus 100 is installed in the backward part of the vehicle as shown in FIG. 3B, no need arises to raise the floor surface inside the vehicle, so that reduction of vehicle roominess can be avoided.

Figure 4:
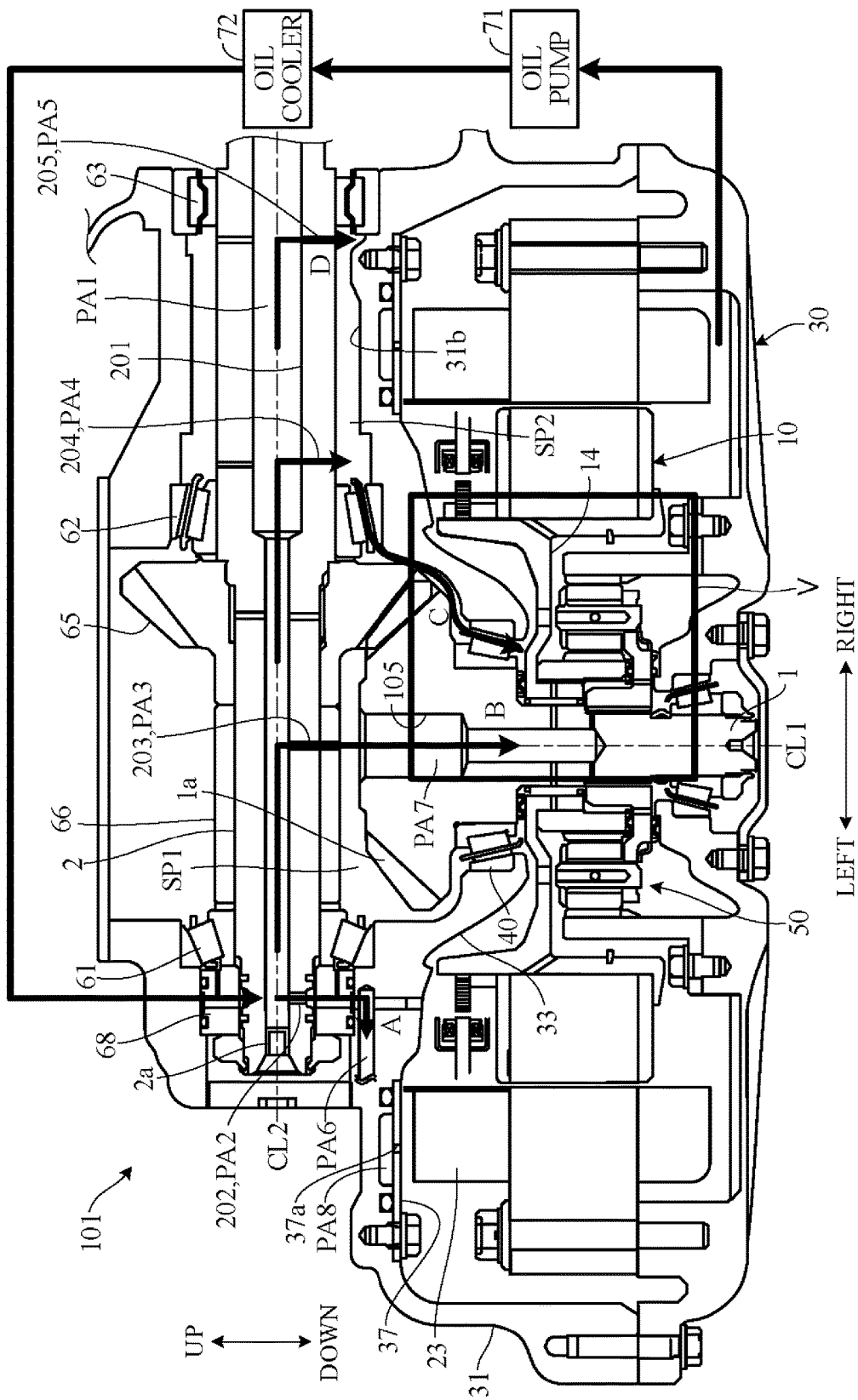
FIG. 4 is a diagram showing oil supply paths of the vehicle drive apparatus according to the embodiment of the present invention.

Oil for lubrication and cooling are supplied to components of the vehicle drive apparatus 100 according to the present embodiment. FIG. 4 is a diagram showing oil supply paths inside the first drive unit 101. As shown in FIG. 4, an axial hole 201 of circular cross-section is formed inside the second shaft 2 to extend from right to left along axis CL2, and the axial hole 201 forms an oil passage PA1. A left end of the axial hole 201 is closed by a cap 2a.

Through-holes 202 to 205 are formed in an outer peripheral surface of the second shaft 2 to extend as far as the axial hole 201. The through-holes 202 to 205 are formed in order axially from the left side. Specifically, multiple circumferentially spaced through-holes 202 are formed leftward of the tapered roller bearing 61, multiple circumferentially spaced through-holes 203 are formed on an extension of axis CL1, multiple circumferentially spaced through-holes 204 are formed rightward of the tapered roller bearing 62, and multiple circumferentially spaced through-holes 205 are formed leftward of the tapered roller bearing 63. The through-holes 202 to 205 respectively form oil passages PA2 to PA5.

The oil passage PA2 diametrically penetrates an oil guide 68 disposed adjacent to the tapered roller bearing 61 and communicates with an oil passage PA6 provided at an upper part of the upper case 31. The oil passage PA3 diametrically penetrates the spacer 66 and communicates with the housing space SP1 above the first shaft 1 (bevel gear 1a). An axial hole 105 is formed in an upper surface of the first shaft 1 to extend to a predetermined depth along axis CL1. The upper end opening of the axial hole 105 opposes the through-holes 203. The axial hole 105 forms an oil passage PA7. The oil passages PA4 and PA5 of the second shaft 2 both communicate with a housing space SP2 in the through-hole 31b of the upper case 31.

Oil accumulated in a bottom part of the case 30 is sucked up by an oil pump 71, cooled by an oil cooler 72, and then supplied to the oil passage PA1 in the second shaft 2. Oil supplied to the oil passage PA1 flows out of the oil passage PA1 through the individual oil passages PA2 to PA5. The oil pump 71 is, for example, an electrical trochoidal gear pump which is attached to a side surface of the case 30.

An axis CL1-centered substantially ring-shaped recess is formed in an inner upper surface of the upper case 31 and a substantially ring shaped plate 37 is attached to close the recess, whereby the recess forms an oil passage PA8. Multiple circumferentially spaced through-holes 37a are formed in the plate 37. Oil flowing out through the oil passage PA2 flows into the oil passage PA6 at the upper part of the upper case 31, as indicated by arrow "A" in FIG. 4. Oil flowing into oil passage PA6 is supplied to the winding 23 through the substantially ring-shaped oil passage PA8 and the through-holes 37a of the plate 37 above the winding 23, thereby cooling the winding 23. Oil flowing out through the oil passage PA3 flows through the housing space SP1 into the oil passage PA7 in the first shaft 1 as indicated by arrow B in FIG. 4.

Oil flowing out through the oil passage PA4 is led through the housing space SP2 to the tapered roller bearing 62, as indicated by arrow C in FIG. 4. After passing the tapered roller bearing 62, this oil flows along a tapered upper surface of the shaft support 33, passes the tapered roller bearing 40 and is led to an upper surface of the plate portion 14 of the rotor 10. More specifically, the oil is led to the upper surface of the plate portion 14 from above by force of gravity. Oil flowing out through the oil passage PA5 is led through the housing space SP2 to the roller bearing 63, as indicated by arrow D in FIG. 4.

Figure 5A:
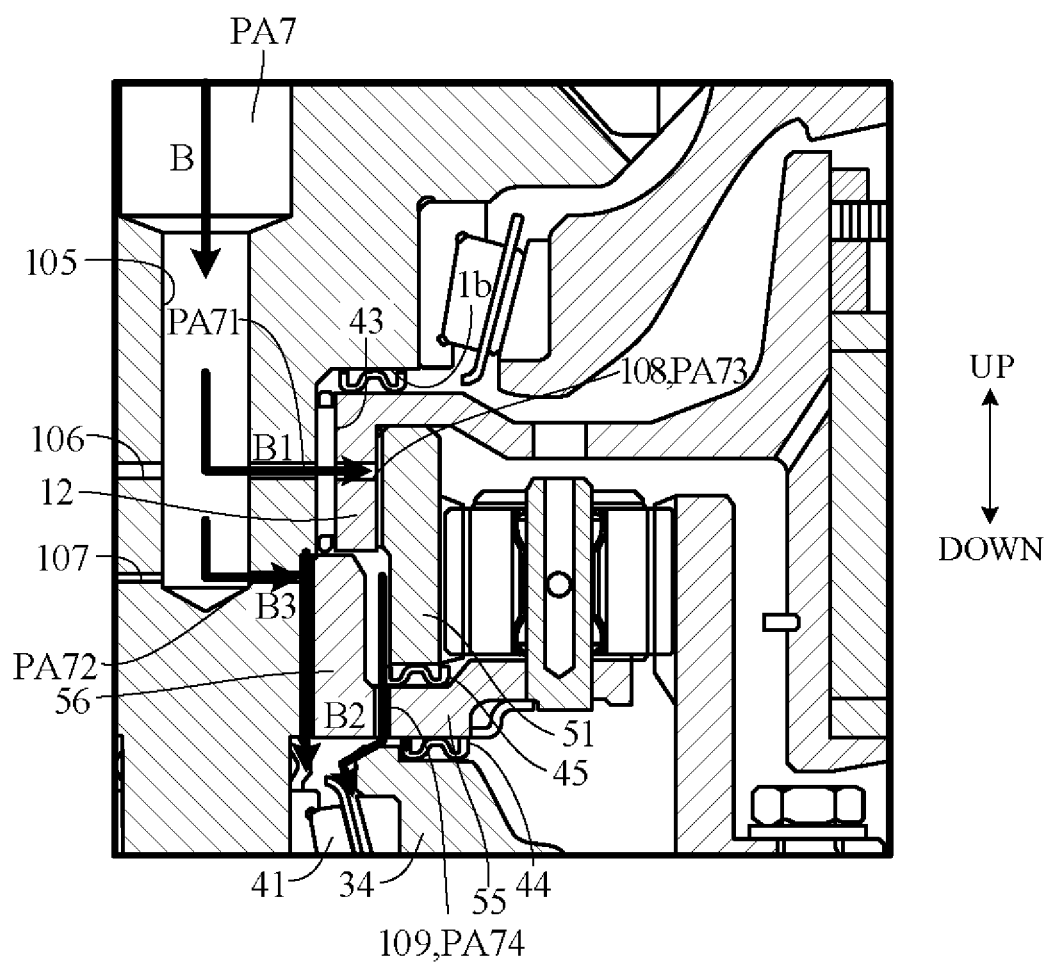
FIG. 5A is an enlarged view of a region V of FIG. 4 and a view showing flow of oil from an oil passage inside a first shaft.
Figure 5B:
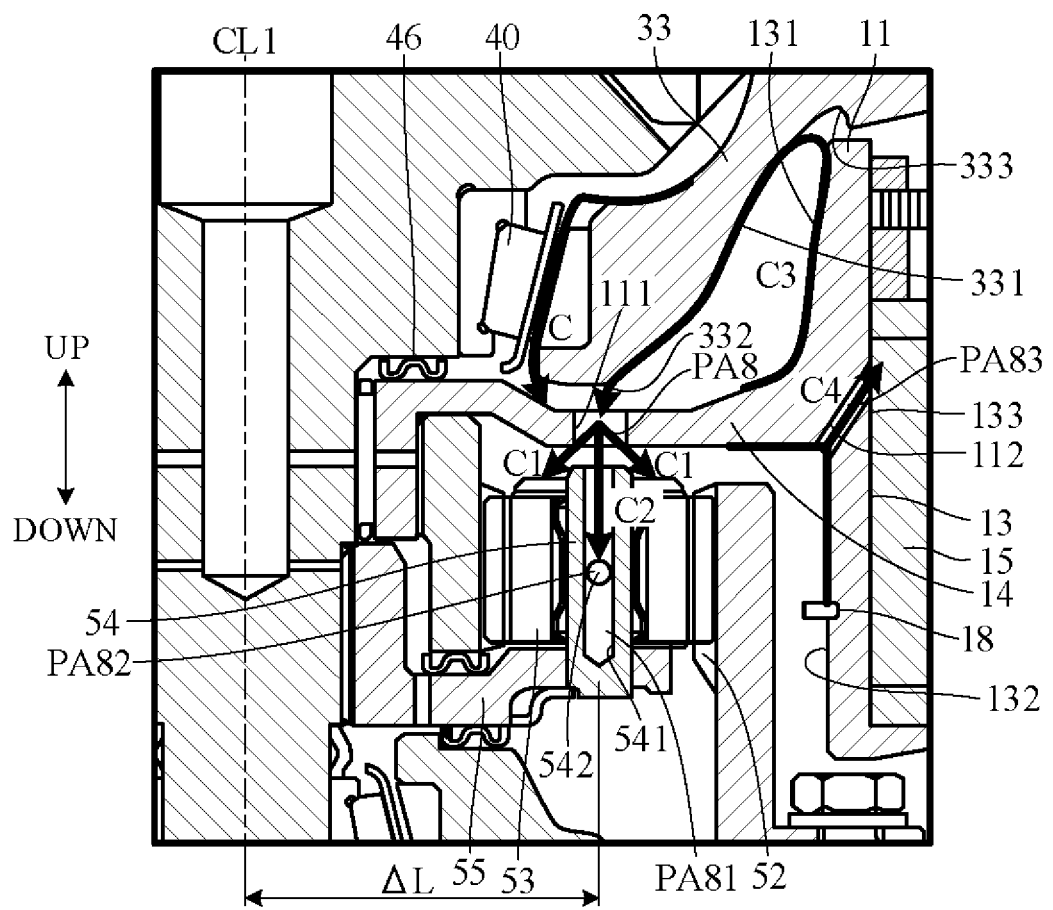
FIG. 5B is an enlarged view of a region V of FIG. 4 and a view showing flow of oil to a planetary gear.

FIGS. 5A and 5B are enlarged views of the region V enclosed by a square in FIG. 4. FIG. 5A shows flow of oil from the oil passage PA7 inside the first shaft 1, i.e., flow of oil following that indicated by arrow B in FIG. 4. FIG. 5B shows flow of oil from the upper surface of the plate portion 14 of the rotor 10, i.e., flow of oil following that indicated by arrow C in FIG. 4.

As shown in FIG. 5A, radial through-holes 106 and 107 are formed in the first shaft 1 to extend from predetermined axial locations on the outer peripheral surface of the first shaft 1 to the axial hole 105. More specifically, multiple circumferentially spaced through-holes 106 are formed below the step 1b to face a vertical central portion of the needle bearing 43, and multiple circumferentially spaced through-holes 107 are formed below the through-holes 106 to face an upper end portion of the shaft portion 56 of the carrier 55. Multiple circumferentially spaced through-holes 108 are formed in the shaft portion 12 of the rotor hub 11 at the same vertical position as the through-holes 106. Multiple circumferentially spaced through-holes 109 are formed vertically in the carrier 55 radially outward of the shaft portion 56 and radially inward of the needle bearings 44 and 45. The through-holes 106 to 109 respectively form oil passages PA71 to PA74.

As indicated by arrow B1 in FIG. 5A, some oil supplied to the oil passage PA7 is led to the oil passage PA73 through the oil passage PA71 and gaps between cages and rollers of the needle bearing 43. Oil passing through the oil passage PA73 flows downward via splines between the shaft portion 12 of the rotor hub 11 and the sun gear 51, and as indicated by arrow B2, is led through the oil passage PA74 to the tapered roller bearing 41 radially inward of the shaft support 34. Further, as indicated by arrow B3, some oil supplied to the oil passage PA7 passes through the oil passage PA72, whereafter it flows downward via splines between the first shaft 1 and the shaft portion 56 of the carrier 55 and reaches the tapered roller bearing 41. Therefore, components are lubricated by oil supplied to around the first shaft 1.

As shown in FIG. 5B, the plate portion 14 of the rotor hub 11 is formed to be downwardly concave radially outward of the needle bearing 46, and multiple circumferentially spaced through-holes 111 are formed in this concavity. More exactly, the through-holes 111 are formed vertically on a circle of a radius of distance ΔL from axis CL1 to the planetary shafts 54. Bottomed holes 541 of predetermined depth are formed in upper surfaces of the planetary shafts 54. Multiple circumferentially spaced through-holes 542 are formed in outer peripheral surfaces of the planetary shafts 54 to face vertical central portions of the planetary gears 53 and extend to the bottomed holes 541. The through-holes 111 form an oil passage PA8, and the bottomed holes 541 and through-holes 542 respectively form oil passages PA81 and PA82.

An inner peripheral surface 131 of the cylindrical portion 13 of the rotor hub 11 above the plate portion 14 is formed to gently incline radially outward toward an upper end portion, and this inner peripheral surface 131 and the upper surface of the plate portion 14 smoothly merge. An outer peripheral surface of the shaft support 33 is formed with a radially outward and upward sloped inclined surface 331 facing the upper surface of the plate portion 14 and the inner peripheral surface 131 of the cylindrical portion 13. A lower end portion 332 of the inclined surface 331 is located above the through-holes 111. The inclined surface 331 protrudes downward above the cylindrical portion 13, and a recess 333 is formed over a whole circumference at an upper end portion of the inclined surface 331 radially inward of the protruding portion.

A groove is provided over a whole circumference on an inner peripheral surface 132 of the cylindrical portion 13 downward of the plate portion 14, and a ring-shaped clip 18 is fitted in the groove. Multiple circumferentially spaced through-holes 112 are formed obliquely in an intersecting region between a lower surface of the plate portion 14 and the inner peripheral surface 132 of the cylindrical portion 13 to extend upward and toward an outer peripheral surface 133 of the cylindrical portion 13. The through-holes 112 form an oil passage PA83. Serrations are formed on the outer peripheral surface of the cylindrical portion 13 and the rotor core 15 is connected to the rotor hub 11 (cylindrical portion 13) through the serrations.

As indicated by arrow C1 in FIG. 5B, oil passing through the tapered roller bearing 40 and led to the upper surface of the plate portion 14 is directly supplied through the oil passage PA8 to the planetary gears 53, and also flows through the oil passage PA8 into the oil passage PA81 in the planetary shafts 54. Oil flowing into the oil passage PA81 flows out from the outer peripheral surface of the planetary shafts 54 through the oil passage PA82 to be supplied to the planetary gears 53. As a result, lubricating oil can be supplied to the planetary gears 53 without providing the carrier 55 with internal oil passages to the planetary shafts 54.

Centrifugal force resulting from rotation of the rotor 10 tends to cause oil led to the upper surface of the plate portion 14 to flow radially outward along the upper surface of the plate portion 14 without passing through the oil passage PA8. As indicated by arrow C3, such oil reaching the inner peripheral surface 131 of the cylindrical portion 13 collides with the inclined surface 331 of the shaft support 33, whereafter its radially outward flow is impeded by the recess 333, so that it is concomitantly drawn downward along the inclined surface 331 by gravity and drips from the lower end portion 332 of the inclined surface 331. Therefore, such oil can be efficiently fed into the oil passage PA82 notwithstanding the effect of centrifugal force.

Oil that passes through the oil passage PA8 and thereafter flows radially outward of the ring gear 52 along the lower surface of the plate portion 14 owing to centrifugal force flows downward along the inner peripheral surface 132 of the cylindrical portion 13. This oil flow is blocked by the ring-shaped clip 18. Therefore, oil flows through the oil passage PA83 to between the mating surfaces of the rotor hub 11 and the rotor core 15 (onto the outer peripheral surface 133 of the cylindrical portion 13). As a result, lubricating oil is supplied to the serrations, thereby inhibiting fretting of mating surfaces.

Figure 6A:
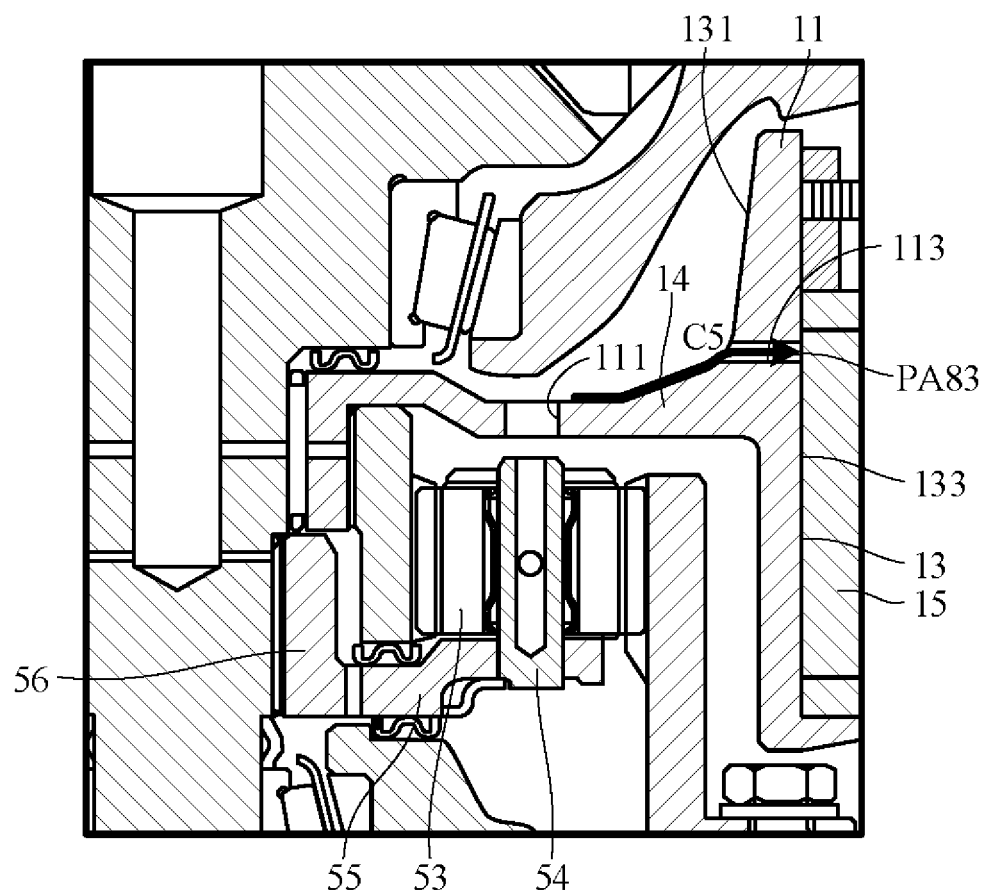
FIG. 6A is a diagram showing a modification of FIG. 5B.
Figure 6B:
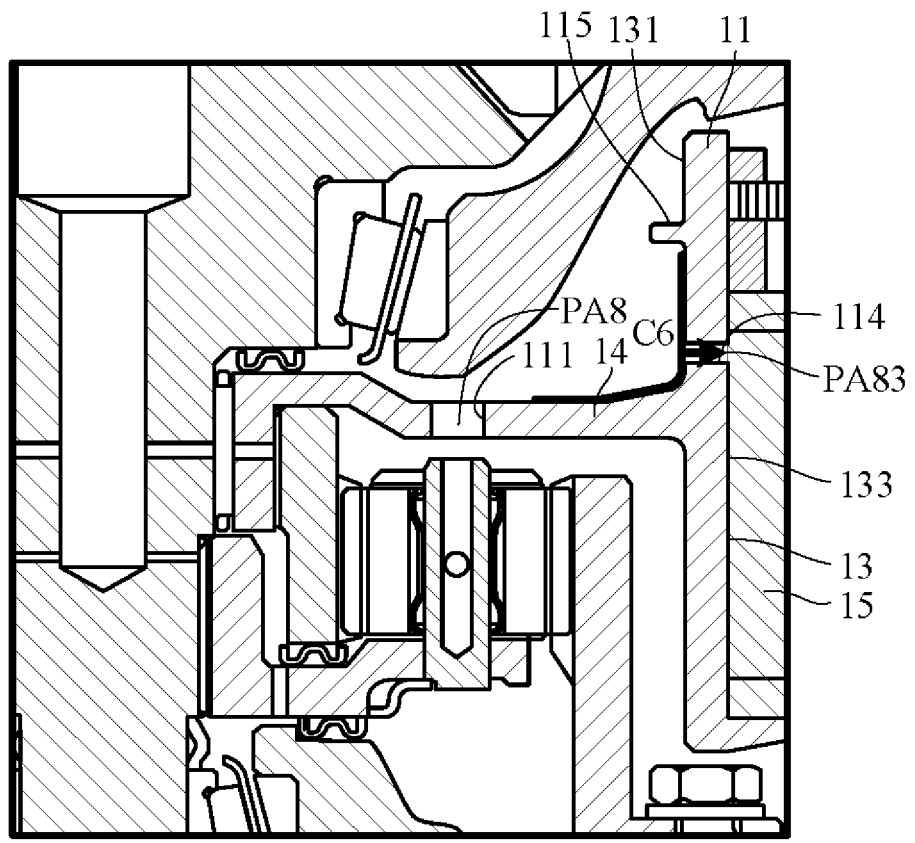
FIG. 6B is another diagram showing a modification of FIG. 5B.
Figure 7:
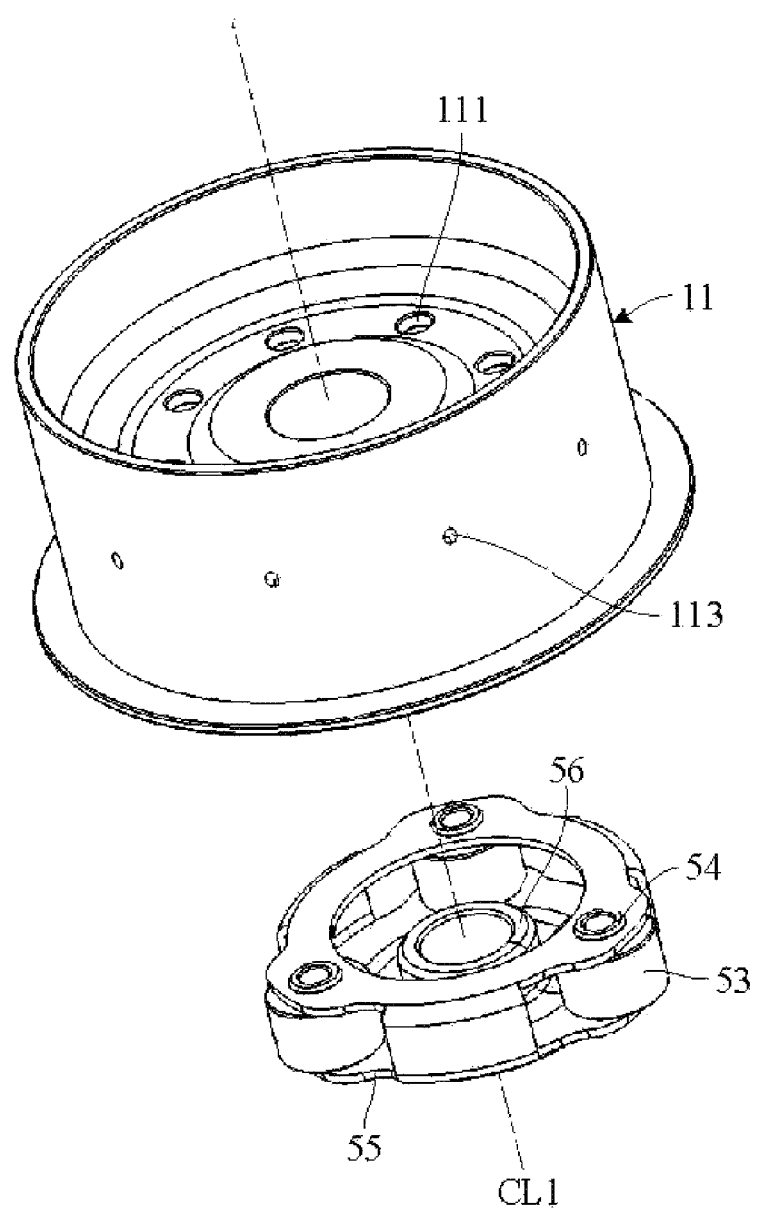
FIG. 7 is a perspective view of a component of FIG. 6A.

FIGS. 6A and 6B are drawings showing modifications of the configuration shown in FIG. 5B, and FIG. 7 is diagram showing a perspective view of the rotor hub 11 and planetary gears 53 in the modification of FIG. 6A. FIG. 6A differs from FIG. 5B in the configuration of the oil passage PA83. More specifically, in FIG. 6A, the oil passage PA83 is not formed below the plate portion 14, but, more precisely speaking, is configured by through-holes 113 formed at a connection region above the plate portion 14 where the plate portion 14 and the cylindrical portion 13 smoothly merge so as to extend from the inner peripheral surface 131 of the cylindrical portion 13 to the outer peripheral surface 133. Therefore, as indicated by arrow C5, oil led to the upper surface of the plate portion 14 is passed through the oil passage PA83 and supplied to the mating surfaces of the rotor hub 11 and rotor core 15 by centrifugal force.

FIG. 6B differs from FIG. 5B in the configuration of the oil passage PA83 and the inner peripheral surface 131 of the cylindrical portion 13. More specifically, in FIG. 6B, similarly to in FIG. 6A, the oil passage PA83 is configured by through-holes 114 formed above the plate portion 14 of the rotor hub 11 so as to extend from the inner peripheral surface 131 to the outer peripheral surface 133 of the cylindrical portion 13. In addition, a rib 115 is formed to protrude radially inward completely around the inner peripheral surface 131 of the cylindrical portion 13. Therefore, as indicated by arrow C6, oil led to the upper surface of the plate portion 14 and caused to flow upward along the inner peripheral surface 131 of the cylindrical portion 13 by centrifugal force is blocked by the rib 115. This promotes flow of oil through the oil passage PA83 to the mating surfaces of the rotor hub 11 and rotor core 15.

According to the embodiment, the following operations and effects can be achieved.

(1) The vehicle drive apparatus 100 includes: the first shaft 1 extending along the axis CL1 in the vertical direction; the planetary gear mechanism 50 having the sun gear 51 disposed around the first shaft 1, the ring gear 52 disposed around the sun gear 51, the planetary gears 53 disposed between the sun gear 51 and the ring gear 52 and engaged with the sun gear 51 and the ring gear 52, the planetary shafts 54 extending parallel to the axis CL1 and rotatably supporting the planetary gears 53, and the carrier 55 supporting the planetary shafts 54; and the rotor 10 having the substantially ring-shaped plate portion 14 covering the planetary gears 53 from above and the cylindrical portion 13 erected from an outer periphery of the plate portion 14 and adapted to transmit torque through the planetary gear mechanism 50 from the rotor 10 to the first shaft 1; and the second shaft 2, rotor hub 11 (cylindrical portion 13) and planetary shafts 54 forming the oil passages PA1, PA4, PA8, PA81 and PA82 for leading lubricating oil supplied from the oil pump 71 from above the rotor 10 through the upper surface of the plate portion 14 to the planetary gears 53 (FIGS. 2, 4, 5B). The oil passage PA8 is configured by multiple circumferentially spaced through-holes 111 formed vertically in the plate portion 14 along a circle whose radius is distance from axis CL1 to the planetary shafts 54, and the oil passages PA81 and PA82 are configured by the bottomed holes 541 and through-holes 542 formed inside the planetary shafts 54 to extend from the upper surfaces to the outer peripheral surfaces of the planetary shafts 54 (FIG. 5B).

Owing to this configuration, no oil passage for supplying lubricating oil to the planetary gears 53 needs to be provided inside the carrier 55 of the planetary gear mechanism 50. This is because supply of lubricating oil to the planetary gears 53 is enabled by the provision of the through-holes 111 in the plate portion 14 of the rotor hub 11 above the vertically extending planetary shafts 54 at positions corresponding to the planetary shafts 54. Therefore, the planetary gear mechanism 50 can be structurally simplified.

(2) The vehicle drive apparatus 100 further includes the shaft support 33 installed above the plate portion 14 to rotatably support the first shaft 1 through the tapered roller bearing 40 (FIG. 2). The shaft support 33 has the inclined surface 331 of substantially truncated cone shape provided to face the upper surface of the plate portion 14 and the inner peripheral surface 131 of the cylindrical portion 13 and slope from above the through-holes 111 toward above the cylindrical portion 13 (FIG. 5B). This enables oil flowing radially outward of the through-holes 111 due to centrifugal force to flow along the inclined surface 331 and fall from the lower end portion 332 above the through-holes 111, whereby the oil can easily be caused to flow into the oil passage PA8.

(3) The rotor 10 includes the rotor hub 11 having a serration formed on the outer peripheral surface of the cylindrical portion 13 and the rotor core 15 joined thereto by fitting on the outer peripheral surface of the cylindrical portion 13. The through-holes 112 to 114 are formed in the cylindrical portion 13 so that some of the lubricating oil led to the upper surface of the plate portion 14 is led to the serrations (FIGS. 5B, 6A and 6B). Therefore, since lubricating oil can be supplied to the serrations of the mating surfaces of the rotor 10, fretting can be inhibited.

(4) The vehicle drive apparatus 100 further includes the stator 20 disposed around the rotor 10 to serve as a component of the motor MT in cooperation with the rotor 10 (FIG. 2). Since this enables the motor MT to be installed with axis CL1 directed vertically, height of the motor MT can be minimized. As a result, the vehicle drive apparatus 100 can achieve high-output of motor MT torque through the planetary gear mechanism 50 to the first shaft 1 with a compact configuration. Therefore, when the vehicle drive apparatus 100 is configured as a propulsion apparatus, efficient installation of the vehicle drive apparatus 100 in the vicinity of a driveshaft, as shown, for example, in FIGS. 3A and 3B, can be easily realized.

(5) The bevel gear 1a is provided on the upper end portion of the first shaft 1 (FIG. 1). The vehicle drive apparatus 100 further includes the laterally extending second shaft 2 provided with the bevel gear 65 to be engaged with the bevel gear 1a (FIG. 1). The oil passages PA1 and PA4 are configured by the axial hole 201 formed laterally inside the second shaft 2 and supplied with lubricating oil from the oil pump 71 and by the through-holes 204 formed from the axial hole 201 to the outer peripheral surface of the second shaft 2 so as to enable discharge of lubricating oil passed into the axial hole 201 onto the upper surface of the plate portion 14 (FIG. 4). Therefore, in the adopted configuration wherein the first shaft 1 and second shaft 2 transmit torque through the bevel gears 1a and 65, oil fed into the second shaft 2 can easily be led to the planetary gears 53 by flow under force of gravity.

In the aforesaid embodiment, the first shaft 1 having the bevel gear 1a extends along the vertical axis CL1, but a rotating shaft is not limited to this configuration. In the aforesaid embodiment, torque of the motor MT is transmitted to the first shaft 1 through the planetary gear mechanism 50, but transmission of torque of the first shaft 1 through the planetary gear mechanism 50 to the motor MT is also possible. In the aforesaid embodiment, the shaft support 33 is provided to extend from the opening 31a of the upper case 31, but it is possible instead to provide the upper case 31 and the shaft support 33 separately and unify them using bolts or the like. Therefore, a shaft support member is not limited to this configuration.

In the aforesaid embodiment, a configuration is adopted wherein the oil passages PA1, PA4, PA8, PA81 and PA82 are formed to convey lubricating oil discharged from the oil pump 71 serving as a hydraulic power source through the axial hole 201 and through-holes 204 of the second shaft 2, the through-holes 111 of the plate portion 14 of the rotor hub 11, and the bottomed holes 541 and through-holes 542 of the planetary shafts 54, and feed the conveyed lubricating oil from above the rotor 10 onto the planetary gears 53 via the upper surface of the plate portion 14, but an oil passage forming part is not limited to this configuration. In other words, insofar as holes are formed vertically in the plate portion 14 along a circle whose radius is distance $\Delta L$ from the axis CL1 to the planetary shafts 54, plate through holes arranged a circumferential direction are in no way limited to the configuration of the aforesaid through-holes 111, and insofar as holes are formed inside the planetary shafts 54 to extend from the upper surfaces to the outer peripheral surfaces of the planetary shafts 54, shaft through holes are in no way limited to the aforesaid bottomed holes 541 and through-holes 542.

In the aforesaid embodiment, the axial hole 201 and through-holes 204 are formed inside the second shaft 2, but a first hole and second hole are not limited to this configuration. In the aforesaid embodiment, the vehicle drive apparatus 100 has a configuration wherein the bevel gear 1a (first bevel gear) of the first shaft 1 (first rotating shaft) and the bevel gear 65 (second bevel gear) of the second shaft 2 (second rotating shaft) are engaged with each other, but a vehicle drive apparatus is not limited to this configuration. In other words, the present invention can also be similarly applied to a vehicle drive apparatus having no bevel gears.

In the aforesaid embodiment, the rotor 10 is configured by serration-coupling the rotor hub 11 as a first rotor and the rotor core 15 as a second rotor, but a rotor can be of any configuration insofar as it has a plate portion formed in a substantially ring shape to cover a planetary gear from above and a cylindrical portion erected from an outer periphery of the plate portion. In the aforesaid embodiment, the rotor 10 of the motor MT is used as a dynamoelectric machine in the vehicle drive apparatus 100, but another type of rotor can also be used in the vehicle drive apparatus. For example, the present invention can also be similarly applied to a vehicle drive apparatus having no motor (e.g., to a transmission or the like). Although the vehicle drive apparatus is used as a drive apparatus for vehicle propulsion in the foregoing, the vehicle drive apparatus of the present invention can also be used as a drive apparatus for other purposes.

The above embodiment can be combined as desired with one or more of the above modifications. The modifications can also be combined with one another.

According to the present invention, it is possible to easily supply a lubricating oil from a hydraulic power source to a planetary gear of a planetary gear mechanism without complicating a configuration of the planetary gear mechanism.

Above, while the present invention has been described with reference to the preferred embodiments thereof, it will be understood, by those skilled in the art, that various changes and modifications may be made thereto without departing from the scope of the appended claims.

What is claimed is:

1. A vehicle drive apparatus, comprising:
    a rotating shaft extending along an axial line in a first direction;
    a planetary gear mechanism including a sun gear provided around the rotating shaft, a ring gear provided around the sun gear, a planetary gear between the sun gear and the ring gear to engage with the sun gear and the ring gear, a planetary shaft extending parallel to the axial line to rotatably support the planetary gear, and a carrier configured to support the planetary shaft;
    a rotor including a plate portion formed in a substantial ring shape adjacent the planetary gear and a cylindrical portion connected to an outer periphery of the plate portion to transmit a torque through the planetary gear mechanism from the rotor to the rotating shaft or from the rotating shaft to the rotor; and
    an oil passage forming part configured to form an oil passage so as to lead a lubricating oil supplied from a hydraulic power source through the plate portion to the planetary gear,
    wherein the oil passage forming part includes plate through holes and a shaft through hole,
    the plate through holes are formed axially in the plate portion so as to penetrate the plate portion and arranged in a circumferential direction along a circle with a radius defined as a distance from the axial line to the planetary shaft, and
    the shaft through hole is formed inside the planetary shaft so as to penetrate the planetary shaft from an end surface to an outer peripheral surface of the planetary shaft.

2. The vehicle drive apparatus according to claim 1, further comprising a shaft support provided adjacent the plate portion to rotatably support the rotating shaft through a bearing, wherein the shaft support includes an inclined surface of a substantially truncated cone shape formed inclined from the plate through hole toward the cylindrical portion and facing the plate portion and an inner peripheral surface of the cylindrical portion.

3. The vehicle drive apparatus according to claim 2, wherein the shaft support includes a recess formed over a whole circumference at an end of the inclined surface.

4. The vehicle drive apparatus according to claim 1, wherein
    the rotor is a first rotor having a serration formed on an outer peripheral surface of the cylindrical portion,
    the vehicle drive apparatus further comprises a second rotor fitted on the outer peripheral surface of the cylindrical portion to join to the cylindrical portion, and
    the cylindrical portion includes a through hole through which the lubricating oil led to the plate portion is supplied to the serration.

5. The vehicle drive apparatus according to claim 1, further comprising a stator arranged around the rotor to serve as a dynamoelectric machine in cooperation with the rotor.

6. The vehicle drive apparatus according to claim 1, wherein
    the rotating shaft is a first rotating shaft including a first bevel gear at an end portion thereof,
    the vehicle drive apparatus further comprises a second rotating shaft extending in a second direction perpendicular to the first direction and including a second bevel gear engaged with the first bevel gear,
    the oil passage forming part includes a first hole to which the lubricating oil supplied from the hydraulic power source is led and a second hole from which the lubricating oil led into the first hole is discharged toward the plate portion,
    the first hole is formed inside the second rotating shaft along an axial line of the second rotating shaft, and
    the second hole is formed from the first hole to an outer peripheral surface of the second rotating shaft.

7. The vehicle drive apparatus according to claim 1, further comprising a shaft support provided adjacent the carrier to rotatably support the rotating shaft through a first bearing, wherein
    the carrier is configured to support a second end portion of the planetary shaft, and
    a surface of the carrier is rotatably supported at an end portion of the shaft support through a second bearing.

8. The vehicle drive apparatus according to claim 1, wherein
    the shaft through hole includes a bottomed hole formed from the end surface of the planetary shaft and radial through holes formed from an outer peripheral surface of the planetary shaft to the bottomed holes and arranged in a circumferential direction.

* * * * *